(12) United States Patent
Yohe et al.

(10) Patent No.: US 12,384,636 B2
(45) Date of Patent: Aug. 12, 2025

(54) MOBILE STACKER UNIT

(71) Applicant: DYCO, INC., Bloomsburg, PA (US)

(72) Inventors: Peter D. Yohe, Bloomsburg, PA (US);
Ronald H. Cordingly, Berwick, PA (US); Mark E. Lovelace, Bloomsburg, PA (US)

(73) Assignee: DYCO, Inc., Bloomsburg, PA (US)

( * ) Notice: Subject to any disclaimer, the term of this patent is extended or adjusted under 35 U.S.C. 154(b) by 0 days.

(21) Appl. No.: 18/419,758

(22) Filed: Jan. 23, 2024

(65) Prior Publication Data

US 2025/0236477 A1    Jul. 24, 2025

(51) Int. Cl.
*B65G 60/00* (2006.01)
*B66F 9/14* (2006.01)

(52) U.S. Cl.
CPC .............. *B65G 60/00* (2013.01); *B66F 9/142* (2013.01)

(58) Field of Classification Search
CPC . B62B 2203/10; B62B 1/142; B62B 2203/24; B62B 2206/04; B62B 3/0618; B62B 3/0612; B62B 3/0625; B66F 9/18; B66F 9/08; B66F 9/085; B66F 9/087; B66F 9/082; B66F 9/122; B66F 9/142; A01G 9/088

See application file for complete search history.

(56) References Cited

U.S. PATENT DOCUMENTS

| | | | | |
|---|---|---|---|---|
| 2,486,324 A * | 10/1949 | Siles | | B66C 1/24 414/621 |
| 2,503,689 A * | 4/1950 | Siles | | B66C 1/24 294/63.1 |
| 2,530,375 A * | 11/1950 | Cartwright | | B66F 9/188 294/63.1 |
| 3,499,658 A * | 3/1970 | Fernholz | | B62B 1/14 280/47.2 |
| 3,807,750 A * | 4/1974 | Brown | | B62B 3/02 280/35 |
| 5,823,737 A * | 10/1998 | Cook | | B66F 9/183 414/667 |
| 7,841,028 B1 * | 11/2010 | Rojas | | A47K 17/00 280/47.24 |
| 9,022,718 B2 * | 5/2015 | Groth | | B62B 1/14 414/349 |
| 9,440,816 B2 * | 9/2016 | Stojanovski | | B65H 31/3018 |
| 9,511,985 B2 * | 12/2016 | Haemmerl | | B66F 9/08 |
| 10,099,908 B1 * | 10/2018 | Kirkpatrick | | B66F 9/18 |
| 10,604,168 B2 * | 3/2020 | Torrison | | B66F 9/18 |
| 2016/0137468 A1 * | 5/2016 | Walker | | B66F 9/142 187/235 |

FOREIGN PATENT DOCUMENTS

NL          1008549 C2 *   9/1999   .......... B65G 57/303

* cited by examiner

*Primary Examiner* — Gregory W Adams
(74) *Attorney, Agent, or Firm* — McNees Wallace & Nurick LLC

(57) ABSTRACT

A mobile stacking apparatus for stacking an article array includes a stacker unit having a pair of stacker arms for containing at least one article array therebetween, each stacker arm includes a plurality of supports for supporting the at least one article array, the plurality of supports are configured to move in and out of the stacker arm caused by a movement of a movable handle attached on the stacker arm, and a vertical frame containing a lifting arrangement, the lifting arrangement includes at least a motor to move the stacker unit in a vertical direction.

19 Claims, 14 Drawing Sheets

MOBILE STACKER UNIT

TECHNICAL FIELD

The present disclosure relates to an apparatus for stacking or unstacking article arrays, more particularly, a mobile stacker unit for stacking or unstacking article arrays from half-high unit loads into full-high unit loads.

BACKGROUND

In many manufacturing instances, it may be desirable to transport large quantities of articles, such as, empty or filled bottles, to different locations of a facility. To reduce the amount of handling required and/or to reduce the amount of shipping material consumed, the articles may be arranged in a tight grouping, or array, of articles and stacked. Further, each layer of article arrays is typically loaded on a pallet and ready for transport.

Conventionally, in order to stack the article arrays, this required a group of personnel (at least 2 or more) to pile the article arrays into a stacked arrangement, which is inefficient and time consuming, as well as potentially hazardous for the personnel. In addition, there is a limit as to how high the personnel can stack the article arrays. Furthermore, there may be damage or breakage to the article itself during the stacking process, leading to costly replacement costs of damaged article(s).

Accordingly, there is a need for improved apparatus for stacking article arrays that do not suffer from these shortcomings.

SUMMARY

In an exemplary embodiment, a mobile stacking apparatus for stacking an article array includes a stacker unit having a pair of stacker arms for containing at least one article array therebetween, each stacker arm includes a plurality of supports for supporting the at least one article array, the plurality of supports are configured to move in and out of the stacker arm caused by a movement of a movable handle attached on the stacker arm, and a vertical frame containing a lifting arrangement, the lifting arrangement includes at least a motor to move the stacker unit in a vertical direction.

In a further exemplary embodiment, a stacking apparatus for stacking an article array includes a stacker unit having a pair of stacker arms for containing at least one article array therebetween, each stacker arm includes a plurality of supports for supporting the at least one article array, the plurality of supports are configured to move from a first position to a second position caused by a movement of a movable handle, wherein in the second position, the plurality of supports face towards each other, and a vertical frame containing a lifting arrangement, the lifting arrangement includes at least a motor to move the stacker unit in a vertical direction.

Other features and advantages of the present invention will be apparent from the following more detailed description of the preferred embodiment, taken in conjunction with the accompanying drawings which illustrate, by way of example, the principles of the invention.

It should be noted that these Figures are intended to illustrate the general characteristics of structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

The present disclosure describes an apparatus for stacking (or unstacking) a half-high stacked article arrays into a full-high stacked article arrays. The present apparatus is mobile or transportable that can be moved to any location in a facility for stacking or unstacking. This creates an efficient and time-saving process in stacking or unstacking of the article arrays. There is also no need for more than one operator to operate the stacking process, unlike conventionally, more than typically four operators were required (i.e., manually lifting), resulting in possible injuries to the operators and/or damage to the article itself.

For purposes herein, the term "article array" may refer to two or more article rows packaged in a packing material. The terms "transported" and "moved" and the like in the context of the interaction between a stacking apparatus and the article array(s) may be used interchangeably. Finally, the terms "stacked" and "lifted" and "raised" and the like in the context of the movements of the article array(s) may be used interchangeably.

Figure 1:
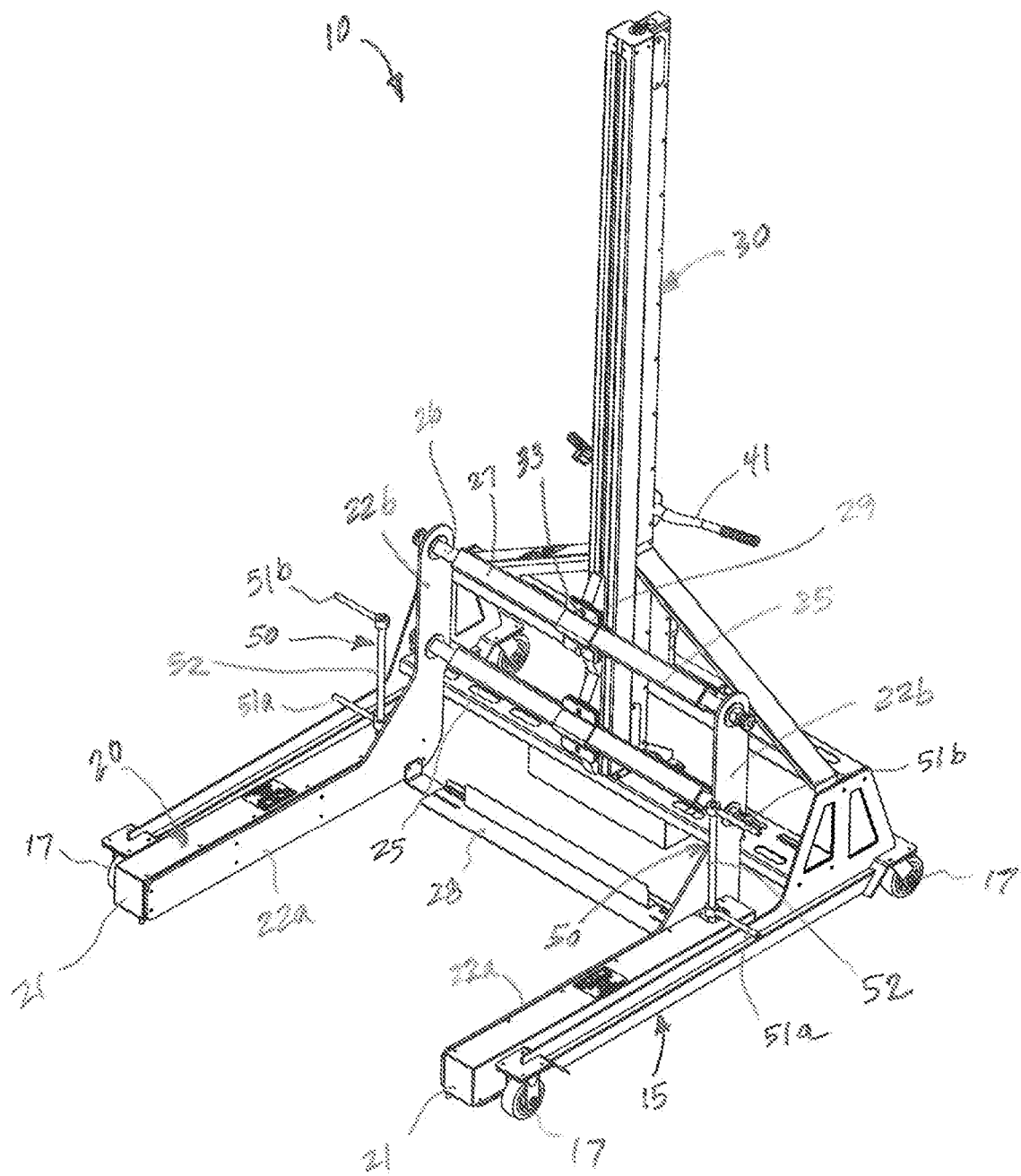
FIG. 1 is a perspective view of an exemplary stacking system, according to an example embodiment.
Figure 2:
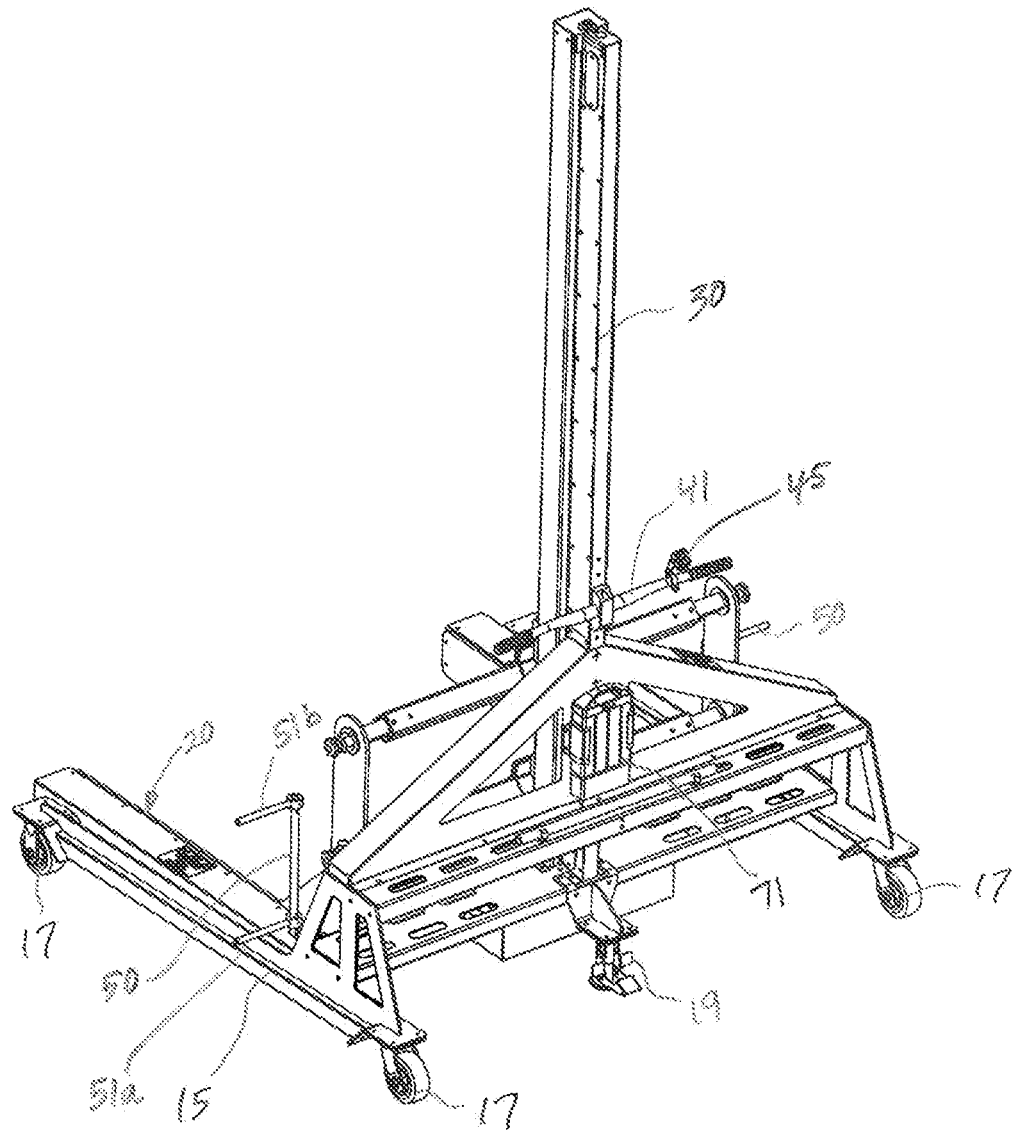
FIG. 2 is a back perspective view of an exemplary stacking system of FIG. 1, according to an example embodiment.

Referring to FIGS. 1 and 2, a stacking apparatus 10 for stacking an article array is shown. More specifically, the stacking apparatus 10 is designed to stack half-high unit loads of article arrays into full unit loads of article arrays. While this disclosure may describe the operation of the stacking apparatus 10 in a stacking process, it should be fully appreciated that the stacking apparatus 10 can also operate in an unstacking process, i.e., from full unit loads of article arrays to half-high unit loads of article arrays or lower. The stacking apparatus 10 can be a fully battery-operated unit that is configured to be mobile or transportable to any location in a facility to stack (or unstack) a plurality of article arrays.

The stacking apparatus 10 includes a frame 15 that supports a stacking unit 20 and a vertical frame member 30 which will be described in detail later. The frame 15 includes a plurality of wheels 17 for transporting the stacking apparatus 10 for operation, i.e., stacking process. In one implementation, there are four wheels 17 at substantially each corner of the frame 15. It should be appreciated that more or less wheels can be employed depending on the load required. For example, there may be an extra wheel between each corner wheel. In some implementations, the wheels 17 can be multi- or omni-directional so as to provide better maneuverability, control and/or tracking. In some implementations, the wheels 17 can be made from, for example, but are not limited to, rubber (e.g., hard rubber, thermoplastic rubber) and/or plastic (e.g., polyolefin, polypropylene, polyurethane), and the like.

As shown in FIG. 2, the frame 15 includes a brake member 19 near a back end thereof to hold and lock the stacking apparatus 10 in its place. In one implementation, the brake member 19 is an adjustable foot pedal where the user can apply pressure to the brake member 19 to lock the brake member 19 to the floor. In addition to holding the stacking apparatus 10 in a stationary position, the brake member 19 acts to stabilize the stacking apparatus 10 for safety purpose. In other implementations, additional brake members 19 can be employed. For example, the brake member 19 can be mounted on the frame 15 between two wheels 17.

Figure 5:
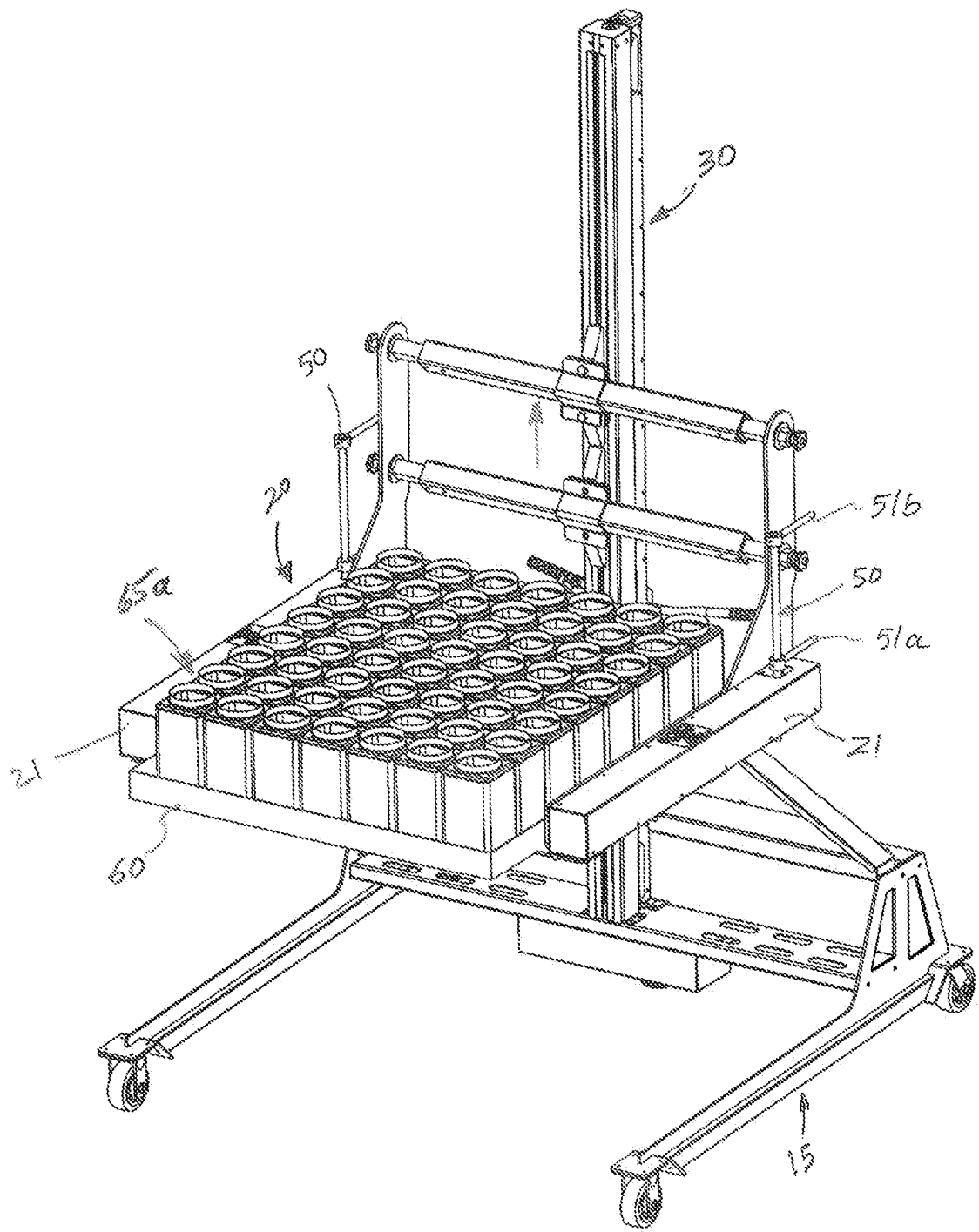
FIG. 5 is a perspective view of an exemplary stacking system with an article arrays, according to an example embodiment.

The stacking unit 20 includes a pair of stacker arms 21 connected to each other by at least two horizontal bar members 25 forming a carriage assembly to support at least one article array 65 (FIG. 5). In other words, the stacking unit 20 is configured to contain (or surround) the article array(s) 65 therebetween as a three-sided structure to support the article array(s), as shown in FIG. 5. This configuration of the carriage assembly enables a better stabilization to hold the article array 65 during stacking and/or transport. In one implementation, the stacker arms 21 are spaced apart from each other to contain a conventional sized pallet supporting the article arrays 65. For example, the stacker arms 21 can be spaced apart 45" designed to support at least a 45"×56" sized pallet. Each stacker arm 21 includes a first arm portion 22a and a second arm portion 22b forming a substantially L-shaped structure. To describe differently, the first arm portion 22a is in a horizontal direction and the second arm portion 22b is in a vertical direction. As shown, the horizontal bar members 25 are interconnected at the second arm portion 22b of the stacker arm 21.

In some implementations, each horizontal bar member 25 includes a first horizontal portion 26 and a second horizontal portion 27 that are co-axially aligned. That is, the second horizontal portion 27 overlaps the first horizontal portion 26 and share a common axis. Further, the horizontal bar members 25 can be adjustable (or telescoping) to accommodate different size dunnage (e.g., pallets, slips, trays, bundles) that holds the article arrays. To describe differently, the movement of the horizontal bar members 25 enables the stacker arms 21 to be closer or farther with respect to each other. As an example, the horizontal bar members 25 can be adjusted up to 7" accommodating a pallet of 38" to 45" wide. In some implementations, the horizontal bar members 25 have a substantially rectangular cross-sectional profile. This profile provides a stronger attachment to the vertical frame 30 and/or reduces stress (tensional or sheer) applied at attachment point 29.

Located below the horizontal bar members 25, the stacking unit 20 further includes a support member 28 positioned between the pair of stacker arms 21. The support member 28 is configured to support the article arrays 65, more specifically, an edge of the article arrays 65. This further stabilizes the article arrays 65 and reduces tilting or tipping.

Figure 3A:
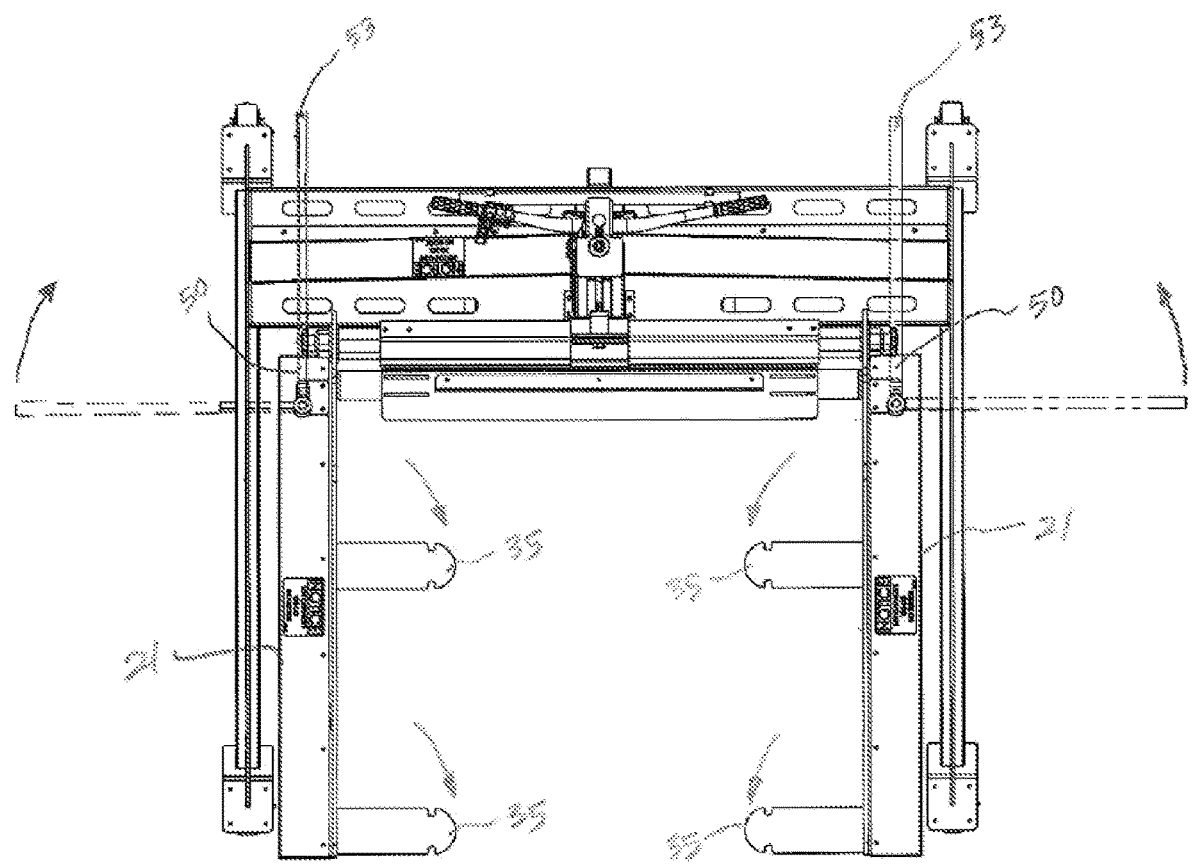
FIG. 3A is a top perspective view of an exemplary stacking system, according to an example embodiment.
Figure 3B:
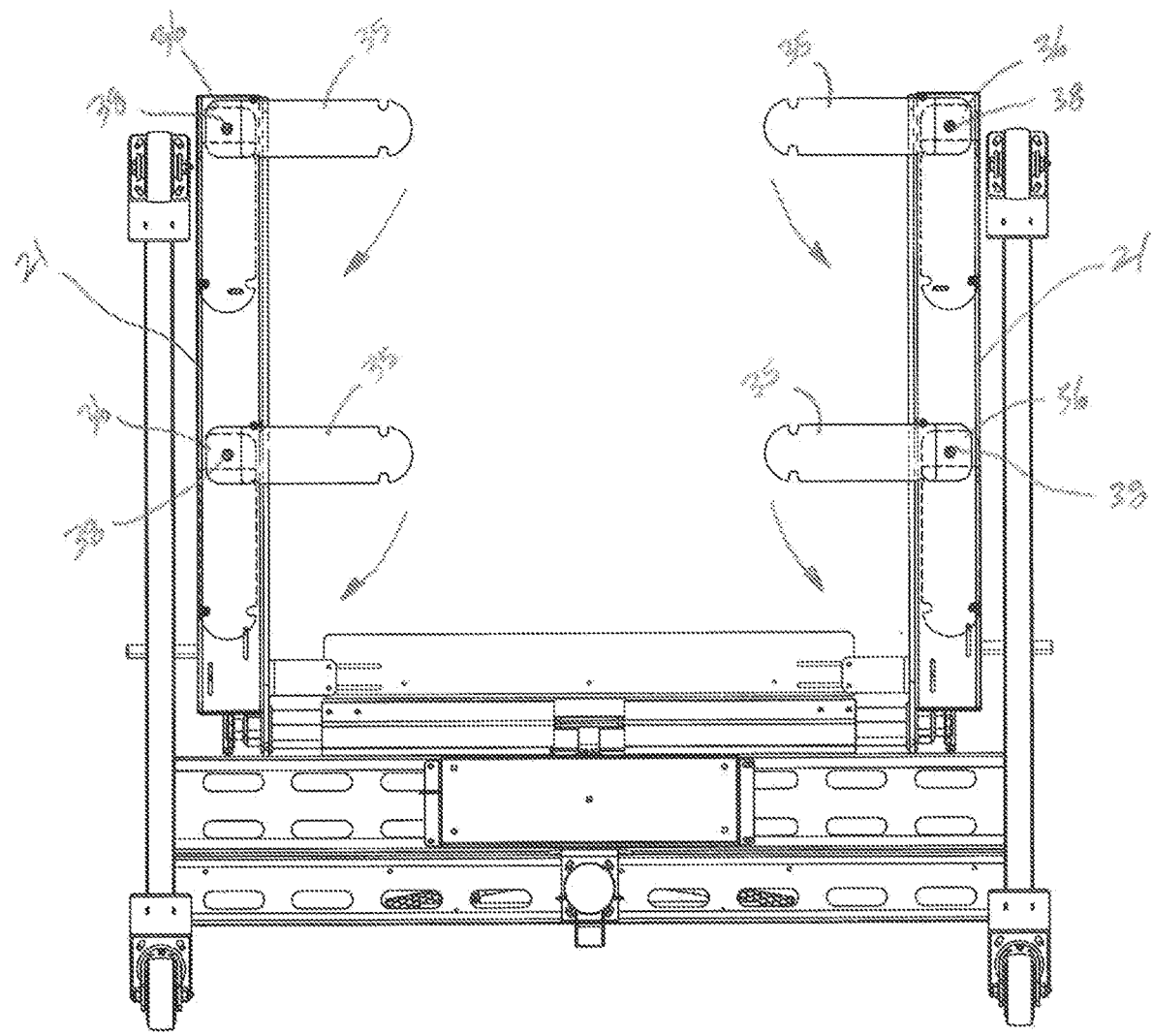
FIG. 3B is a bottom perspective view of an exemplary stacking system, according to an example embodiment.

Referring to FIG. 3A, each stacking arm 21 includes a plurality of support arms 35 that are configured to support a dunnage 60 (e.g., tray) containing the article arrays 65. Each support arm 35 is designed to move by retracting in and out (in a rotational direction) of the stacking arm 21. For example, the support arms 35 are configured to move or rotate up to 90 degrees. In use, the support arms 35 move to extend in a horizontal direction with respect to the stacking arms 21. To describe differently, the support arms 35 face each other to create a larger surface area to support the dunnage 60 containing the article arrays 65. When not in use, the support arms 35 detract back to their initial position in the respective stacking arm 21 (FIG. 3B). To describe differently, the support arms 35 are in a vertical direction with respect to the stacking arms 21. As further shown in FIG. 3B, one end 36 of each support arm 35 is attached to the stacking arm 21 at a bottom surface of the stacking arm 21 via a fastener 38, providing a fixed-pin rotation. In one implementation, the fastener 38 is a bolt. Other fasteners can be employed besides the one described herein.

The movement (i.e., retractable/detractable) of the support arms 35 is controlled by a movable handle 50. As shown in FIG. 3A, there are two movable handles 50, one on each stacker arm 21 controlling a respective set of support arms 35. In other implementations, there can be only one movable handle 50 controlling the supports arms 35 on both stacker arms 21. In one implementation, the movable handle 50 is configured to rotate 90 degrees in a clockwise or counter-clockwise directions. As shown, when the movable handle 50 is positioned (via rotation) in a vertical direction with respect to the stacker arm 21, the support arms 35 concurrently rotate and extend between the two stacker arms 21. In other words, the rotation (i.e., counterclockwise) of the movable handle 50 allows the support arms 35 to rotate and extend between the two stacker arms 21 to support and hold the dunnage 60 containing the article arrays 65 therebetween. Conversely, when the movable handle 50 is positioned (via rotation) in a horizontal direction with respect to the stacker arm 21, the support arms 35 concurrently rotate and extend into the stacker arms 21. In other words, the rotation (i.e., clockwise) of the movable handle 50 allows the support arms 35 to rotate and extend back into the stacker arm 21 in its initial position. Each movable handle 50 can be configured to operate one set of support arms 35 for each respective stacker arm 21.

In other implementations, the movable handle 50 can actuate the support arms 35 to move in a linear direction. That is, rather than moving the support arms 35 in a rotational manner, the support arms 35 can extend along a straight or nearly straight line.

As shown in FIG. 1, the movable handle 50 includes a first handle portion 51a and a second handle portion 51b connected therebetween by a connecting member 52. The first handle portion 51a is positioned lower than the second handle portion 51b. The first handle portion 51a and the second handle portion 51b are configured to permit the user to operate the movable handle 50 at varying heights or elevation. For example, during a loading of a first unit load of article arrays (FIG. 5), the user can operate the movable handle 50 by using the first handle portion 51a rather than the second handle portion 51b. This is contributed to the first handle portion 51a being at a lower elevation than the second handle portion 51b. As such, this permits the user to operate the movable handle 50 without having to use a stepper or ladder or tiptoeing to reach the movable handle 50. As the unit load of article arrays increases and continues to stack (FIGS. 5A-5C), and the stacking unit 20 is lowered, the user can operate the movable handle 50 using the second handle portion 51b, which is at a higher elevation than the first handle portion 51a. This permits the user to operate the movable handle 50 without having to kneel or be in an awkward position, which can cause bodily injury.

Figure 4:
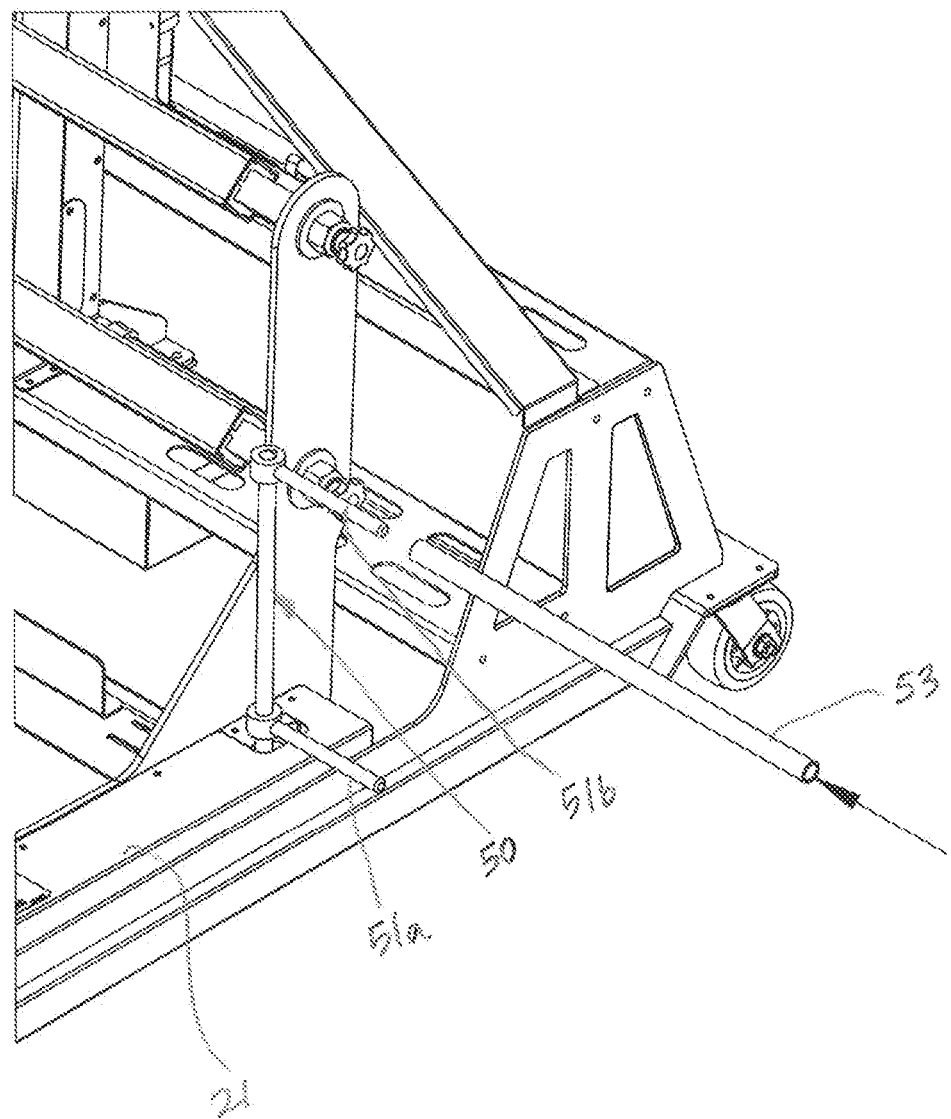
FIG. 4 is a partial perspective view of a movable handle with a leverage member, according to an example embodiment.

In some implementations, as shown in FIG. 4, a leverage member 53 can be used to operate the movable handle 50. More specifically, the leverage member 53 is a device that can apply force to rotate the movable handle 50 with ease. As an example, the leverage member 53 can be a tube piece member that can be inserted into one of the first handle portion 51a or the second handle portion 51b to rotate the movable handle 50. In some implementations, the leverage member 53 can be attached to the first handle portion 51a or the second handle portion 51b and can be removable. In other implementations, the leverage member 53 can be a separate piece and attached to a part of the stacking apparatus 10 to be used at a proper time.

Referring back to FIG. 1, the stacking unit 20 is attached to the vertical frame member 30. More specifically, the horizontal bar members 25 of the stacking unit 20 are attached to the vertical frame member 30 at attachment point 29. In one implementation, the horizontal bar members 25 are attached to vertical frame member 30 via fastening members 33. As an example, the fastening member 33 is a bolt. It should be appreciated that other fastening members are, such as, but are not limited to, screws, bolts, nails, rivets, welding, etc.

The vertical frame member 30 includes a driving system to move the stacking unit 20 in a vertical direction, i.e., up and down. For example, the driving system can move the stacking unit 20 up to 66" from the ground to the bottom of the dunnage (i.e., tray). The driving system has a lifting capacity to lift up to 300 lb. In one implementation, the driving system can be a screw mast driven by a DC motor (not shown). The DC motor is powered by a replaceable or rechargeable battery 71 located on the rear end of the stacking apparatus 10. It is to be understood that the operation and movement of the driving system in the vertical frame member 30 operates in a known manner and not fully described herein, and is driven by any appropriate drive mechanism known in the art, and not limited to those disclosed in the exemplary embodiments herein.

Figure 8:
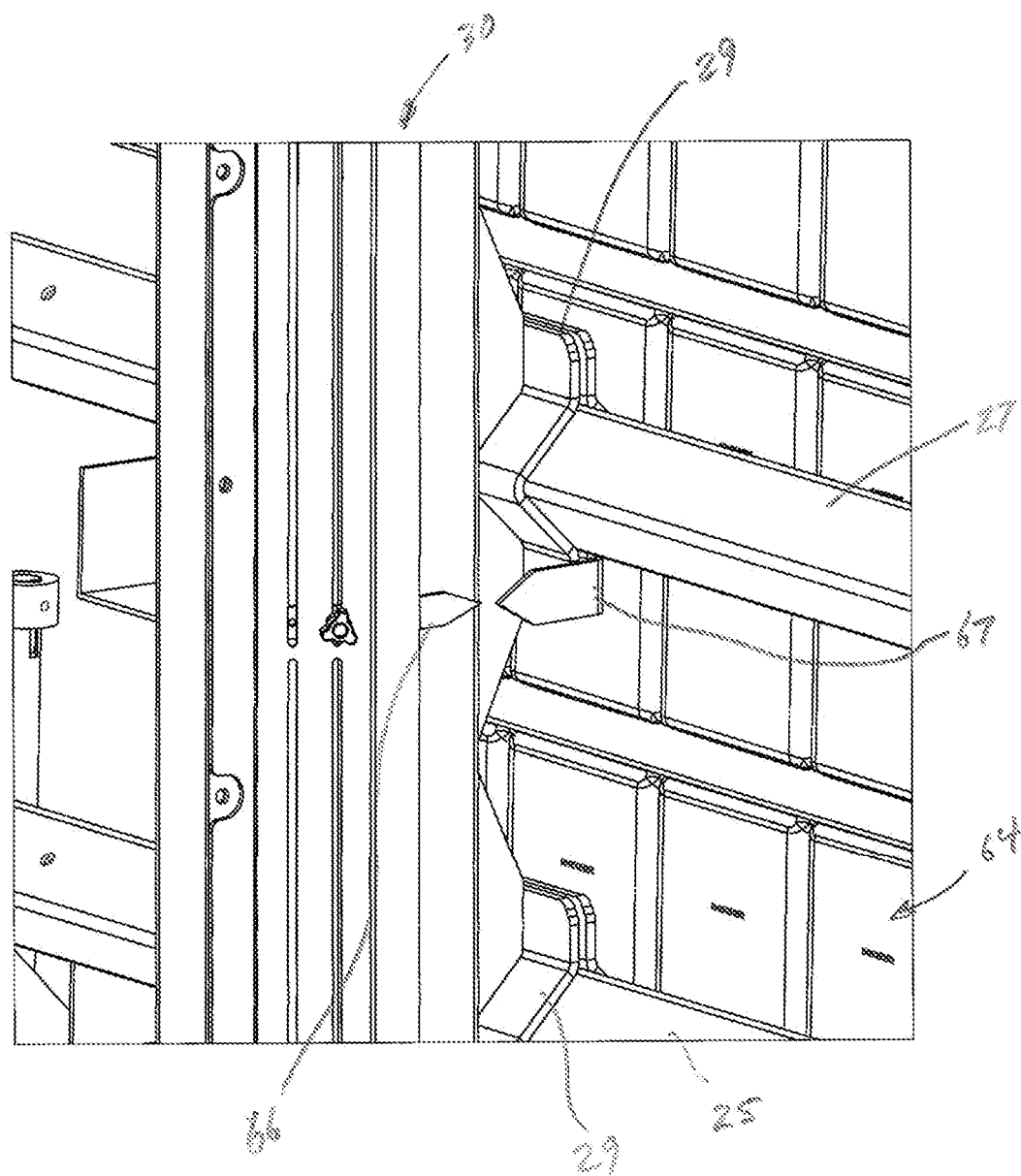
FIG. 8 is a partial perspective view of an exemplary vertical frame, according to an example embodiment.

Referring to FIG. 8, the vertical frame member 30 includes a plurality of markings 66 located along a length of the vertical frame member 30. Correspondingly, the attachment point 29 contains a marker 67 (i.e., pointer) to determine the position of the stacker unit 20 by aligning the marker 67 to one of the markings 66 on the vertical frame member 30 and set for the appropriate height. In addition to setting the appropriate height, the markings 66 can be an indicator to allow the user to easily target the set height. This avoids having to lay the article arrays down and estimating or "eyeing" the appropriate height. In one implementation, the markings 66 can be a colored (e.g., yellow) indicator arrows located along the entire length of the vertical frame member 30. In some implementations, the markers can be set to the approximate height of a half-tall unit load, as a result this can be set at 48" from the ground, for example. In other implementations, there may be only one marking that can be adjustable along the vertical frame member 30.

Referring back to FIG. 2, the stacking apparatus 10 includes a handle 41 for handling the movement of the stacking unit 20 by the user. As shown, the handle 41 is located at the rear end of the stacking apparatus 10. Attached to the handle 10 includes a control switch 45 for operating the driving system of the stacking unit 20. For example, the control switch 45 can include the functions to move the stacking unit 20 in either the up direction or the down direction. In some implementations, the control switch 45 can include speed of the vertical movements of the stacking unit 20. In some implementations, the control switch 45 can include a GO/STOP function. In some implementations, the control switch 45 can include an ON/OFF function. In some implementations, the control switch 45 can include a warning light or alarm that the stacking unit 20 has reached its height limit. As an example embodiment, the control switch 45 is a spring loaded two-position switch.

The operation of the disclosed stacking apparatus 10 will now be described, with reference to FIGS. 5-7A.

Referring now to FIG. 5, in its initial stacking process, the user operates the control switch 45 on the handle 41 and raises the stacking unit 20 to an appropriate height for stacking a first article array 65a. In one implementation, the stacking unit 20 can be raised to a typical waist height or ergonomic height, which can be approximately 36", for example. Once the appropriate height is set, the user operates (rotates) the movable handle 50 to extend the plurality of support arms 35. At this stage, the user may operate the lower handle portion 51a of the movable handle 50 for ease in operating the movable handle 50. It is understood that a second movable handle 50 can be located on other side of the stacking unit 20 to operate the other plurality of support arms 35. When all of the plurality of support arms 35 are positioned between the pair of stacking arms 21, the user places the first article array 65a on the plurality of support arms 35.

Figure 5A:
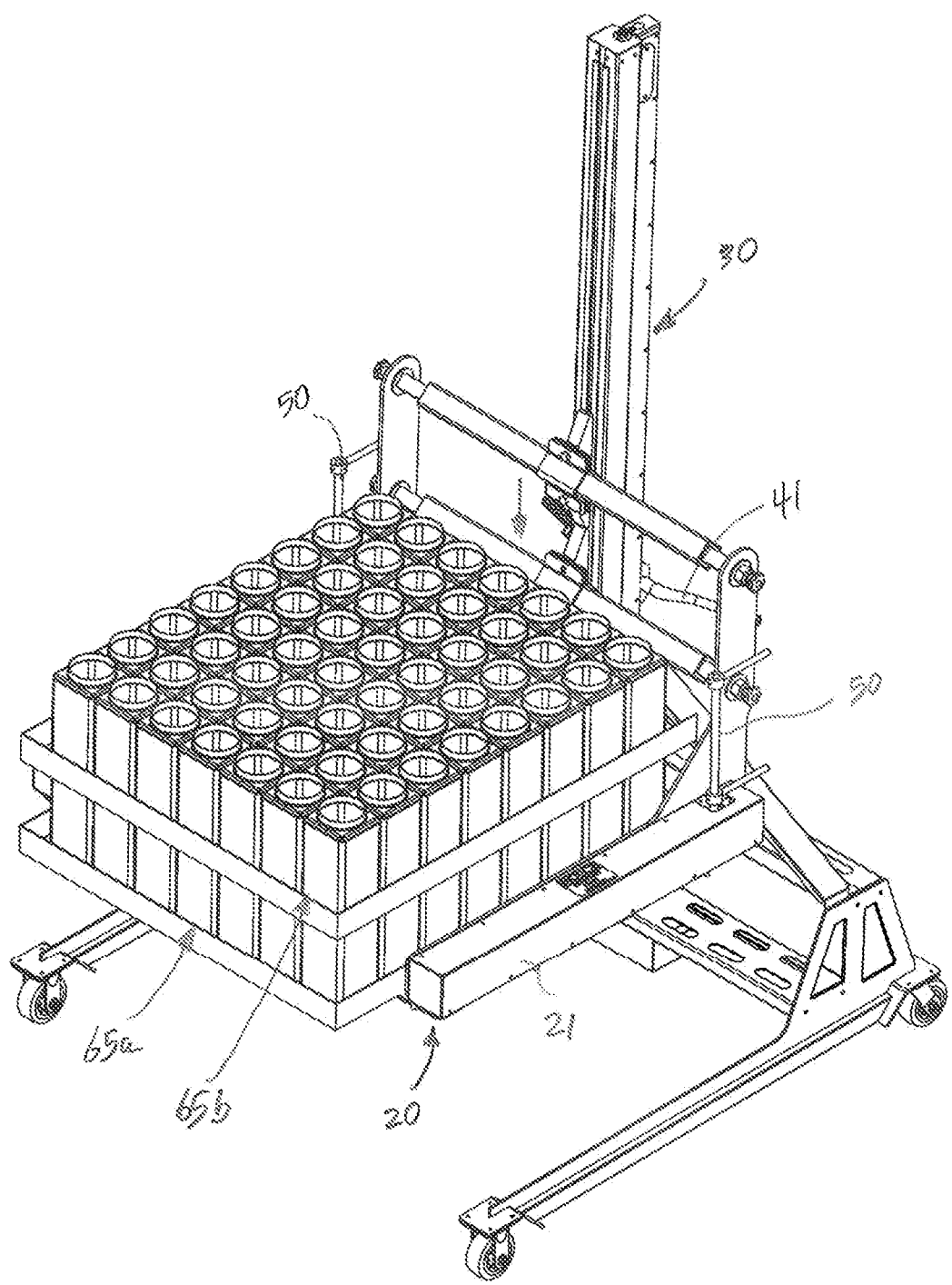
FIGS. 5A-5C are perspective views of an exemplary stacking system with half-high loaded stacked article arrays, according to an example embodiment.

Referring now to FIG. 5A, the user operates the control switch 45 and lowers the stacking unit 20 so as to stack a second article array 65b on top of the first article array 65a.

Figure 5B:
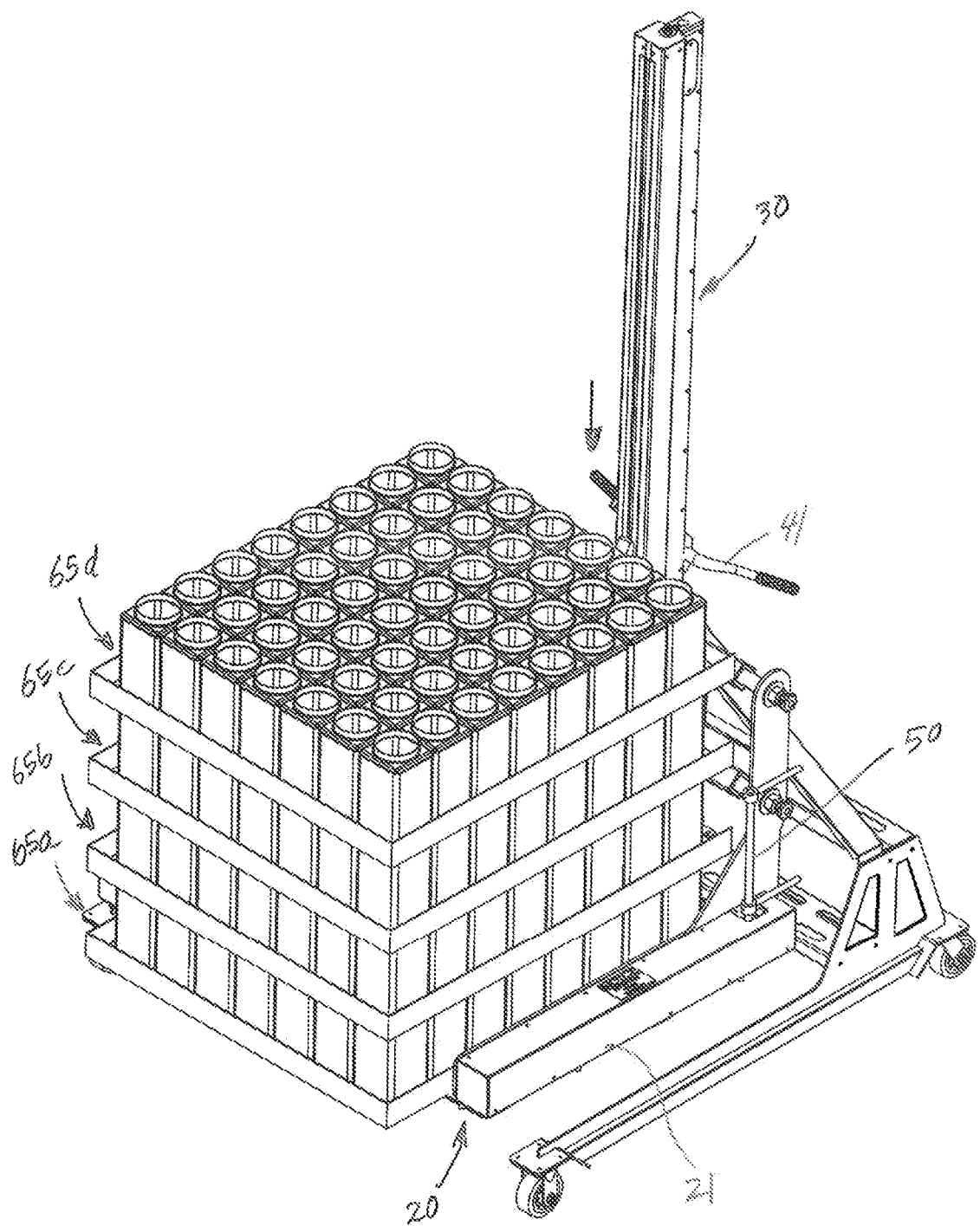

Referring now to FIG. 5B, the user operates the control switch 45 and further lowers the stacking unit 20 so as to stack a third article array 65c on top of the second article array 65b. Further, a fourth article array 65d is stacked on top of the third article array 65c forming a complete half-high load stacked unit.

Figure 5C:
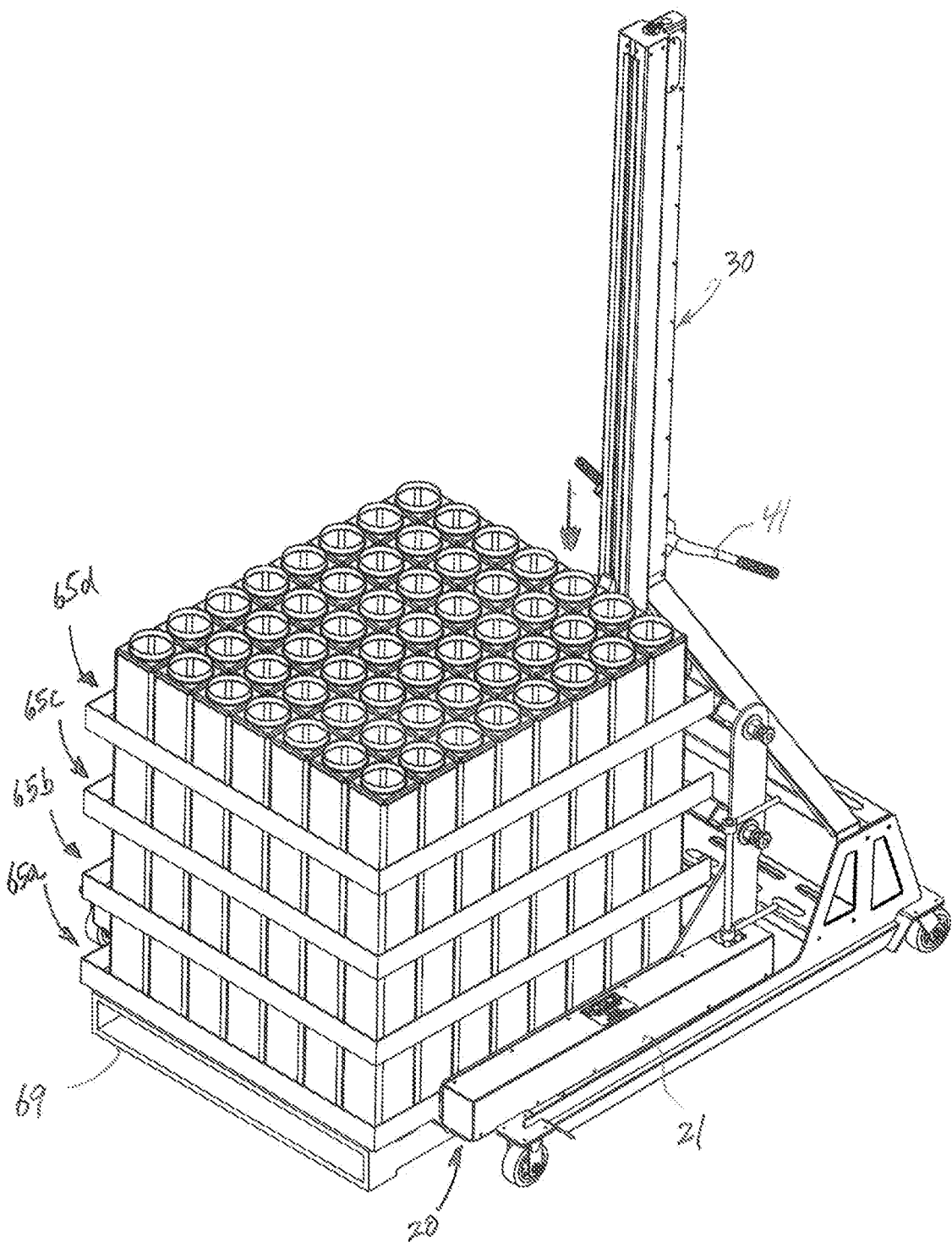
Figure 6A:
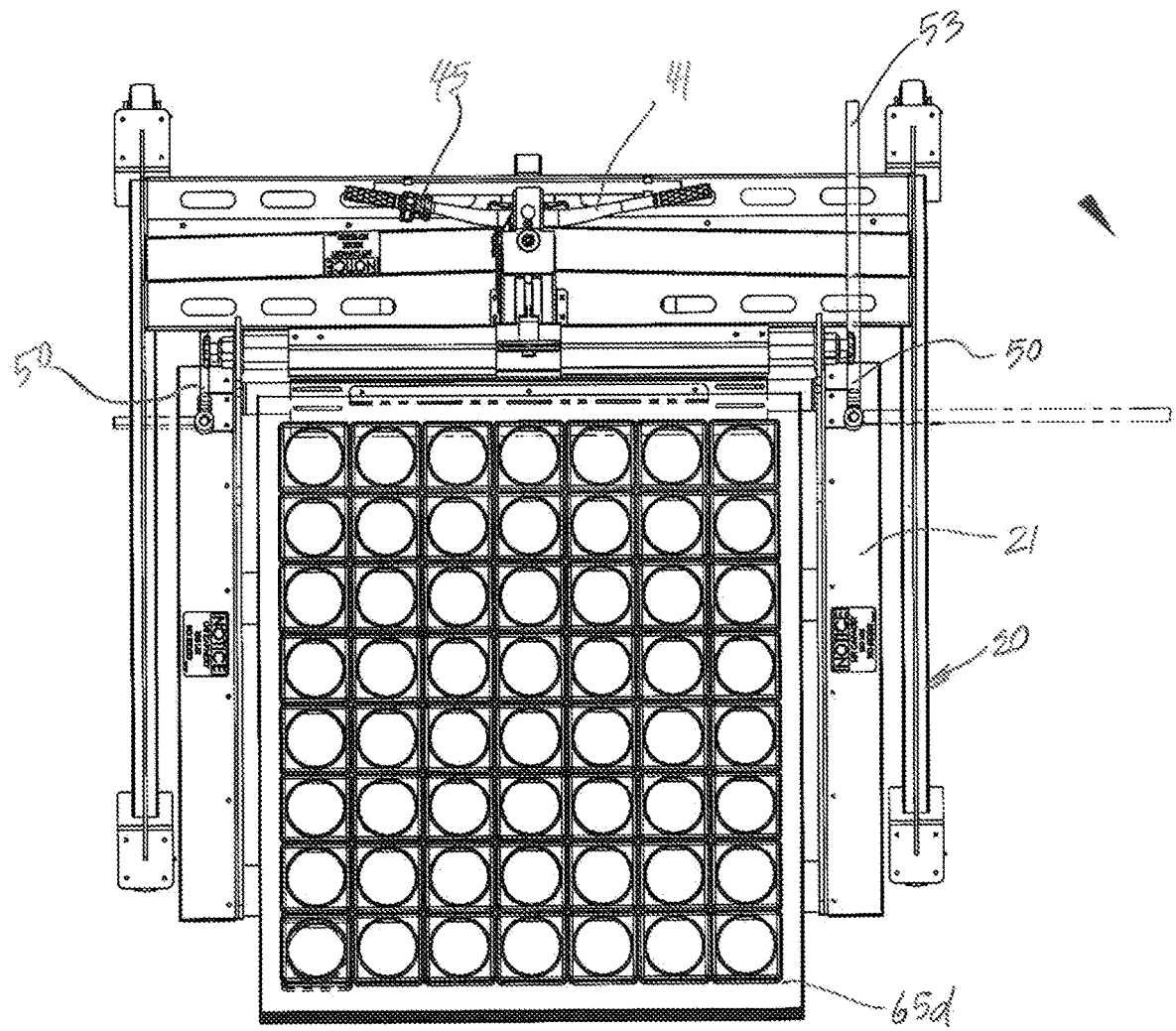
FIG. 6A is a top perspective view of an exemplary stacking system with stacked article arrays, according to an example embodiment.
Figure 6B:
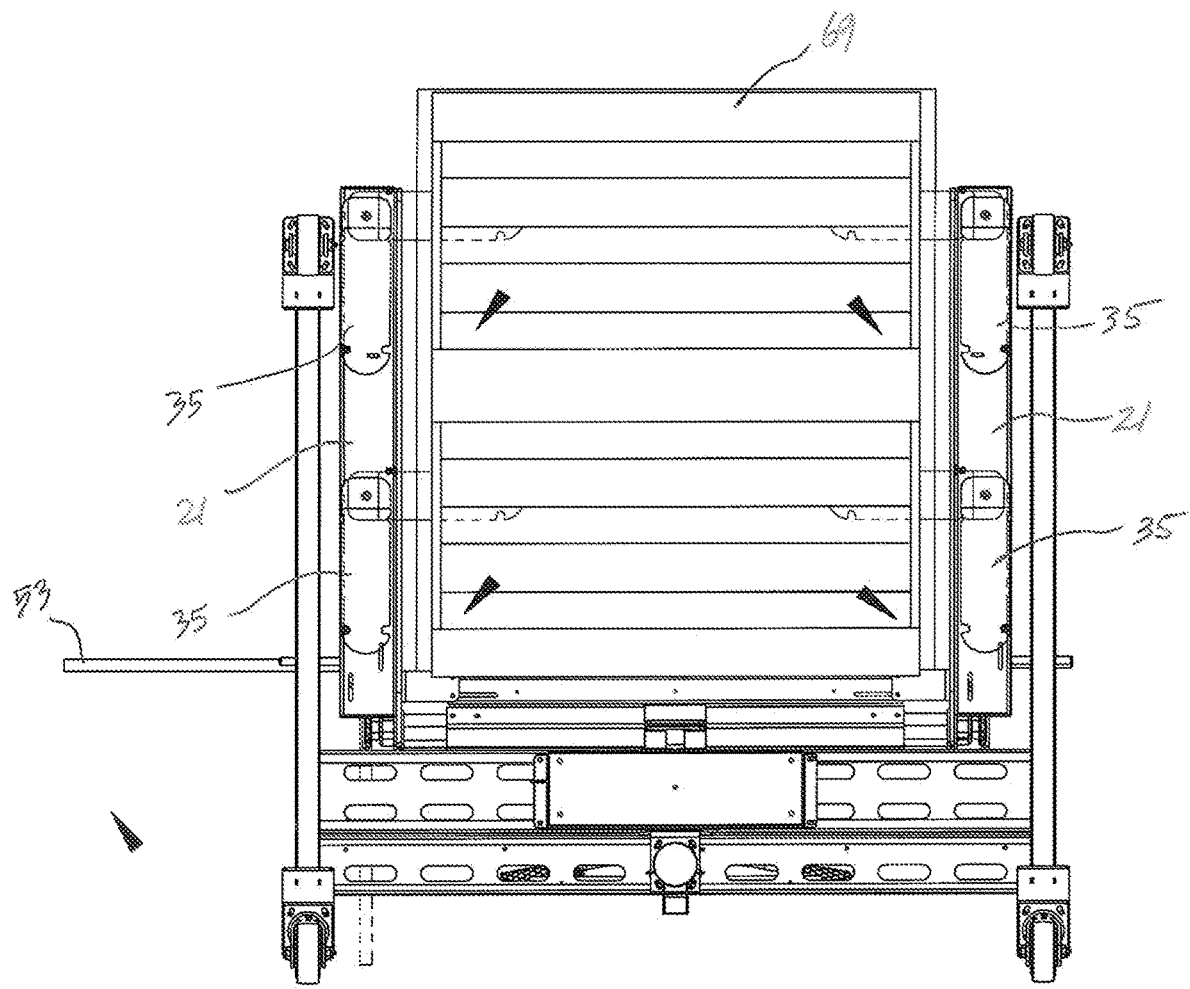
FIG. 6B is a bottom perspective view of an exemplary stacking system with stacked article arrays, according to an example embodiment.

Referring now to FIG. 5C, once the complete half-high load stacked unit is formed, the user moves the stacking apparatus 10 (while supporting the complete half-high load stacked unit) to place the complete half-high load stacked unit onto a pallet 69. Once placed on the pallet 69, the movable handle 50 is operated to detract the plurality of support arms 35 into the stacking arms 21 (FIG. 6A), causing the complete half-high load stacked unit to be entirely on the pallet 69. For example, the movable handle 50 is rotated (i.e., clockwise direction) which concurrently rotates the support arms 35 back into the respective stacking arms 21 (FIG. 6B).

Figure 7A:
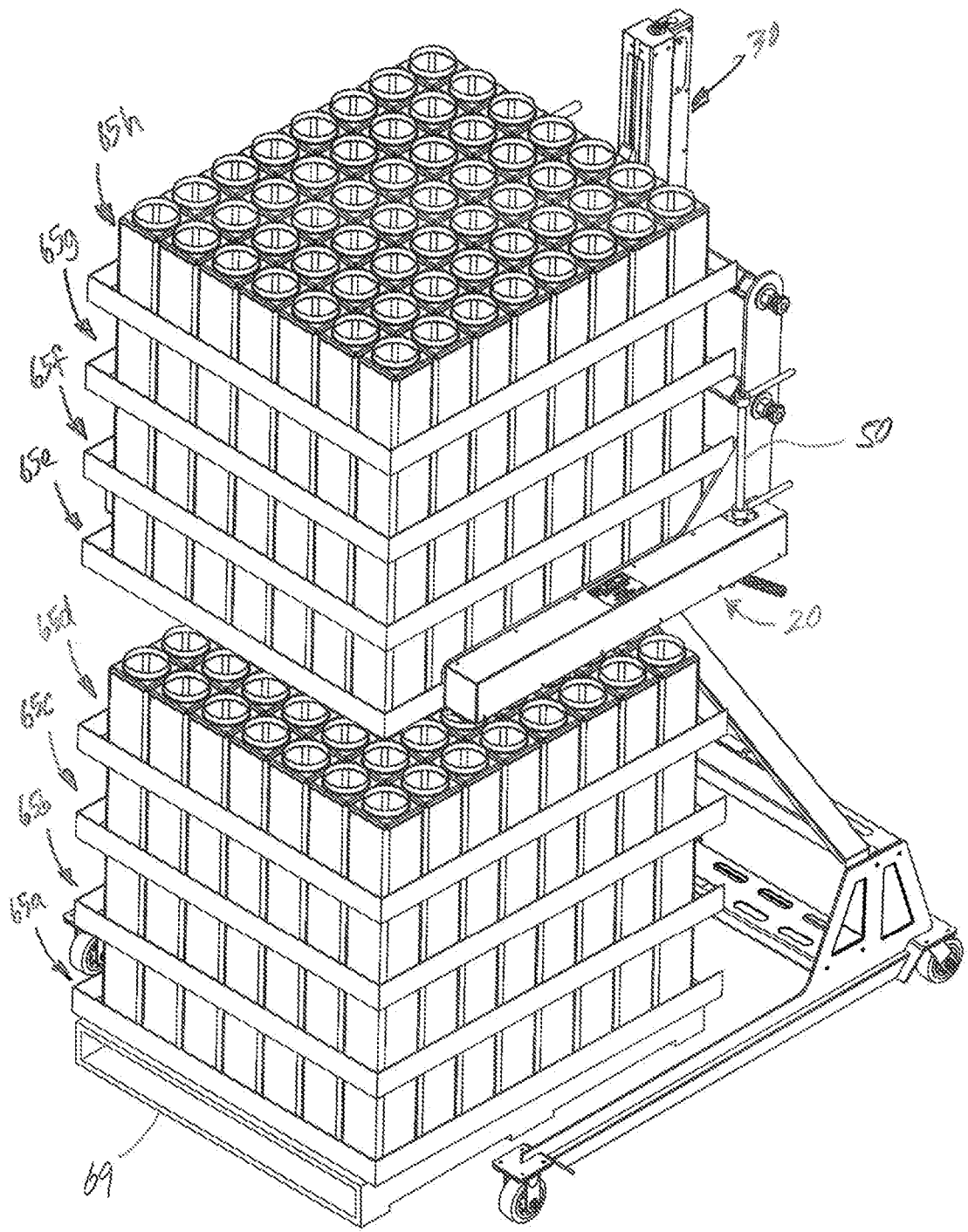
FIGS. 7A and 7B are perspective views of an exemplary stacking system with full-high loaded stacked article arrays, according to an example embodiment.

Referring now to FIG. 7A, in its complete stacking process and to form a full-high load stacked unit, the user repeats the process as described in FIGS. 5-5C and forms a secondary half-high load stacked unit (including article arrays 65e, 65f, 65g, 65h). Once the secondary half-high load stacked unit is formed, the user moves the stacking apparatus 10 over to the previously-stacked half-high load stacked unit (with pallet 69) and raises the stacking unit 20 above the previously-stacked half-high load stacked unit.

Figure 7B:
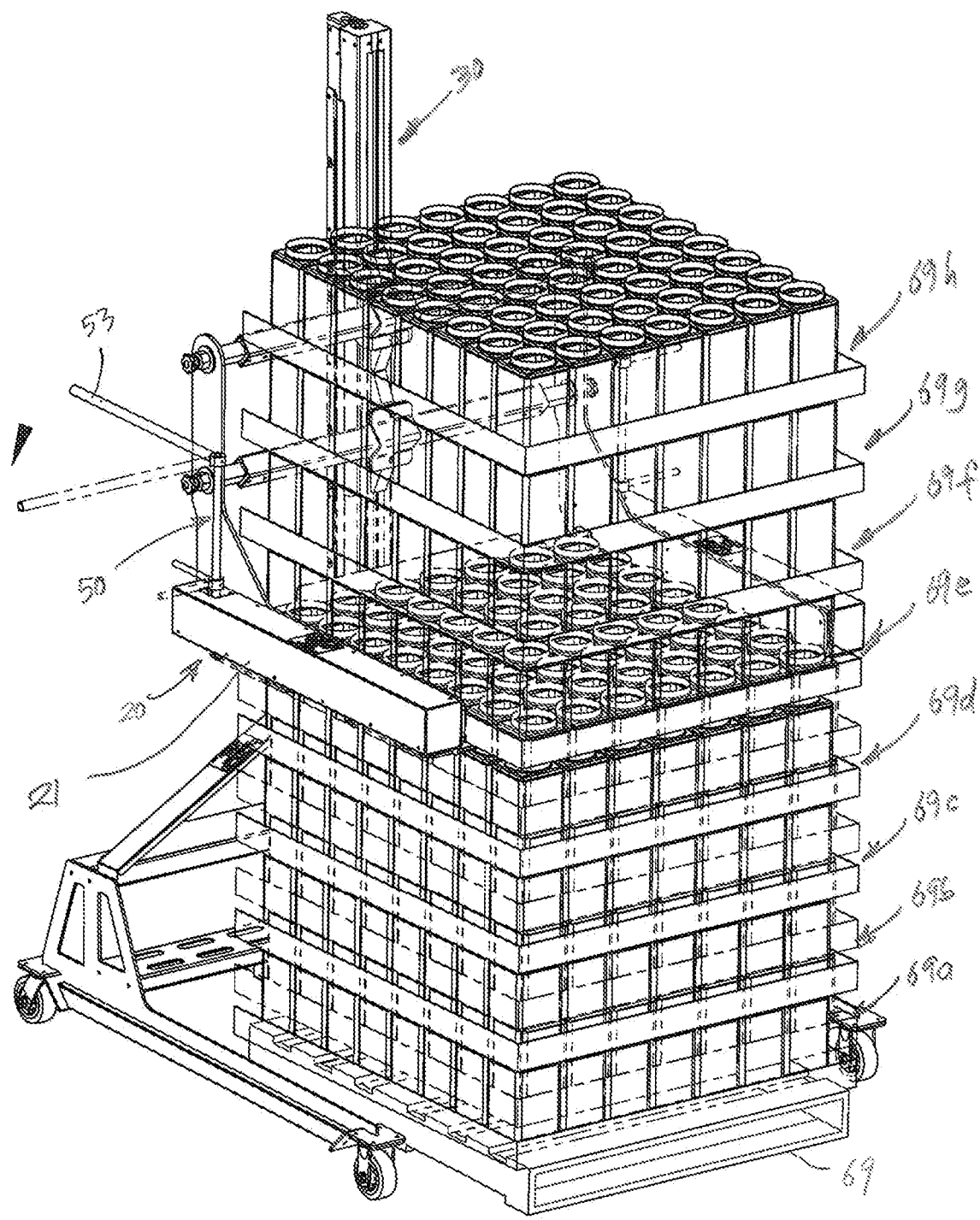

Referring now to FIG. 7B, once the secondary half-high load stacked unit is above the previously-stacked half-high load stacked unit, the secondary half-high load stacked unit is lowered to engage the previously-stacked half-high load stacked unit and forms a complete full-high load stacked unit. Once placed on the previously-stacked half-high load stacked unit, the movable handle 50 is operated to detract the plurality of support arms 35 into the stacking arms 21, forming the complete full-high load stacked unit. Thereafter, the stacking apparatus 10 is removed away from the complete full-high load stacked unit.

In some implementations, sensors (not shown), such as a laser sensor may be employed for determining positional locations of the article arrays 65. For example, the laser sensor may emit a beam for determining when the stacking unit 20 properly stacks the article arrays 65 in a half-high load, for determining when the article arrays 65 are centered between the stacking arms 21, for determining when the article arrays 65 is positioned for stacking to a full-high load, and the like. For purposes herein, sensors are intended to include other types of devices, such as proximity switches that make physical contact with the article array 65, or other suitable position-determining devices or sensors may be used to determine for positional locations.

The aspects and embodiments of the invention can be used alone or in combinations with other systems and methods.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"At least one," as used herein, means one or more and thus includes individual components as well as mixtures/combinations.

The transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinarily associated with the specified material(s). The term "consisting essentially of" limits the scope of a claim to the specified elements, steps or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A mobile stacking apparatus for stacking an article array, comprising:
 a stacker unit including a pair of stacker arms for containing at least one article array therebetween, each stacker arm includes a plurality of supports for supporting the at least one article array, the plurality of supports is configured to pivotally rotate outwardly in an orthogonal direction with respect to the stacker arms;
 a movable handle mounted on one of the stacker arm for controlling the movement of the plurality of supports, the movable handle includes a first handle arm portion and a second handle arm portion arranged in a parallel configuration with respect to each other,
 wherein the first handle arm portion and the second handle arm portion are oriented in an orthogonal direction with respect to the stacker arm when the plurality of supports are inside of the stacker arm,
 wherein the first handle arm portion and the second handle arm portion are oriented in a parallel direction with respect to the stacker arm when the plurality of supports are outside of the stacker arm in an extended position,
 wherein the first handle arm portion is positioned in a first height to allow a user to operate the movable handle at a lower height, and
 wherein the second handle arm portion is positioned in a second height to allow the user to operate the movable handle at a higher height; and
 a vertical frame containing a lifting arrangement, the lifting arrangement includes at least a motor to drive the stacker unit in a vertical direction.

2. The mobile stacking apparatus of claim 1, wherein the movable handle is configured in a first position to move the plurality of supports inside of the stacker arms.

3. The mobile stacking apparatus of claim 2, wherein the movable handle is configured in a second position to move the plurality of supports outside of the stacker arms.

4. The mobile stacking apparatus of claim 3, wherein the second position is approximately 90 degrees with respect to the first position.

5. The mobile stacking apparatus of claim 1, wherein the pair of stacker arms are connected to each other by a pair of supporting arms that are supported in a horizontal direction.

6. The mobile stacking apparatus of claim 5, wherein the pair of supporting arms are adjustable to adjust a distance between the pair of stacker arms.

7. The mobile stacking apparatus of claim 5, wherein the pair of supporting arms are connected to the vertical frame, wherein the lifting arrangement of the vertical frame causes the pair of supporting arms to move in the vertical direction.

8. The mobile stacking apparatus of claim 1, wherein the lifting arrangement further includes a switch to operate the movement of the motor.

9. The mobile stacking apparatus of claim 8, wherein the switch is a spring loaded two-way switch.

10. The mobile stacking apparatus of claim 1, wherein the vertical frame includes at least one marking to indicate a height of a stacked article arrays.

11. The mobile stacking apparatus of claim 10, wherein the at least one marking is adjustable along the vertical frame.

12. The mobile stacking apparatus of claim 1, further comprising a plurality of rollers to move the mobile stacking unit.

13. A mobile stacking apparatus for stacking an article array, comprising
 a base frame;
 a stacker unit including a pair of stacker arms for containing at least one article array therebetween, each stacker arm includes a plurality of supports for supporting the at least one article array, the plurality of supports is configured to pivotally rotate from a first position to a second position, wherein in the second position, the plurality of supports face towards each other;
 a movable handle mounted on one of the stacker arm for controlling the movement of the plurality of supports, the movable handle includes a first handle arm portion and a second handle arm portion arranged in a parallel configuration with respect to each other,
 wherein the first handle arm portion and the second handle arm portion are oriented in an orthogonal direction with respect to the stacker arm when the plurality of supports are in the first position,
 wherein the first handle arm portion and the second handle arm portion are oriented in a parallel direction with respect to the stacker arm when the plurality of supports are in the second position,
 wherein the first handle arm portion is positioned in a first height to allow a user to operate the movable handle at a lower height, and
 wherein the second handle arm portion is positioned in a second height to allow the user to operate the movable handle at a higher height; and
 a vertical frame containing a lifting arrangement, the lifting arrangement includes at least a motor to move the stacker unit in a vertical direction.

14. The mobile stacking apparatus of claim 13, wherein:
 in the first position, each of the plurality of supports is positioned inside of the stacker arms; and
 in the second position, each of the plurality of supports is positioned outside of the stacker arms to support the at least one article array.

15. The mobile stacking apparatus of claim 13, wherein the pair of stacker arms are connected to each other by a pair of supporting arms that are supported in a horizontal direction.

16. The mobile stacking apparatus of claim 15, wherein the pair of supporting arms are adjustable to adjust a distance between the pair of stacker arms.

17. The mobile stacking apparatus of claim 15, wherein the pair of supporting arms are connected to the vertical frame, wherein the lifting arrangement of the vertical frame causes the pair of supporting arms to move in the vertical direction.

18. The mobile stacking apparatus of claim 13, wherein the vertical frame includes at least one marking to indicate a height of a stacked article arrays.

19. The mobile stacking apparatus of claim 13, further comprising a plurality of rollers on the base frame to move the mobile stacking unit.

* * * * *